(12) United States Patent
May et al.

(10) Patent No.: US 7,343,483 B1
(45) Date of Patent: Mar. 11, 2008

(54) CONFIGURING BOTH A PROGRAMMABLE LOGIC DEVICE AND ITS EMBEDDED LOGIC WITH A SINGLE SERIALIZED CONFIGURATION BIT STREAM

(75) Inventors: Roger May, Bicester (GB); Andrew Draper, Chesham (GB)

(73) Assignee: Altera Corporation, San Jose, CA (US)

( * ) Notice: Subject to any disclaimer, the term of this patent is extended or adjusted under 35 U.S.C. 154(b) by 486 days.

(21) Appl. No.: 10/792,407

(22) Filed: Mar. 2, 2004

Related U.S. Application Data

(63) Continuation of application No. 09/668,704, filed on Sep. 22, 2000, now Pat. No. 6,732,263.

(60) Provisional application No. 60/211,094, filed on Jun. 12, 2000.

(51) Int. Cl.
*G06F 15/177* (2006.01)
(52) U.S. Cl. ......................................................... 713/1
(58) Field of Classification Search ...................... 713/1
See application file for complete search history.

(56) References Cited

U.S. PATENT DOCUMENTS

| | | | |
|---|---|---|---|
| 5,282,163 A | 1/1994 | Shibata | |
| 5,757,639 A | 5/1998 | Yamada | |
| 5,892,961 A | 4/1999 | Trimberger | |
| 5,970,254 A | 10/1999 | Cook et al. | |
| 6,134,707 A | 10/2000 | Herrmann et al. | |
| 6,191,614 B1 | 2/2001 | Schultz et al. | |
| 6,259,271 B1 | 7/2001 | Couts-Martin et al. | |
| 6,363,019 B1 | 3/2002 | Erickson et al. | |
| 6,567,970 B1 * | 5/2003 | Nayak et al. | ............ 716/17 |
| 6,732,263 B1 * | 5/2004 | May et al. | ............ 713/1 |

FOREIGN PATENT DOCUMENTS

| | | |
|---|---|---|
| EP | 0419105 A2 | 3/1991 |
| WO | WO 00/31652 A2 | 6/2000 |

OTHER PUBLICATIONS

McKenzie et al.: "A Versalile Application Bootload for Field Programmable SOC," Motorola Technical Developments, 39:77-79 (1999).
"AT94K Series Field Programmable System Level Integrated Circuit: Advance Information," product information Atmel Corp. San Jose, CA (1999).
"CS2000 Reconfigurable Communications Processor Family Product Brief," product information Chameleon Systems Inc. San Jose, CA (2000).

(Continued)

*Primary Examiner*—Rehana Perveen
*Assistant Examiner*—Eric Chang
(74) *Attorney, Agent, or Firm*—Townsend and Townsend and Crew LLP

(57) ABSTRACT

A method and apparatus for configuring a digital system having a programmable logic device and embedded logic from a configuration source that supplies a single serialized configuration bit stream for configuring both the programmable logic device and the embedded logic.

20 Claims, 3 Drawing Sheets

OTHER PUBLICATIONS

"Wireless Base Station Design Using Reconfigurable Communications Processors," product Information Chameleon Systems Inc. San Jose, CA (2000).

"Triscend E5 Configurable System-on-Chip Family" product description, Triscend Corporation, Mountain View, CA pp. 1-90 (2000).

XILINX: "DS060 (V1.5) Product Specification"; 2000, Spartan and Spartan-XL Families Field Programmable Gate Arrays, pp. 4-61 thru 4-113.

* cited by examiner

CONFIGURING BOTH A PROGRAMMABLE LOGIC DEVICE AND ITS EMBEDDED LOGIC WITH A SINGLE SERIALIZED CONFIGURATION BIT STREAM

CROSS-REFERENCES TO RELATED APPLICATIONS

This application is a continuation of U.S. patent application Ser. No. 09/668,704, filed Sep. 22, 2000, which claims priority from provisional U.S. Patent Application No. 60/211,094, filed Jun. 12, 2000, which are incorporated by reference into this application for all purposes.

A related application is, U.S. patent application Ser. No. 09/668,665, filed Sep. 22, 2000 in the names of May et al. and entitled "Bus Architecture for System on a Chip" and assigned to the present assignee. Another related application is, U.S. patent application Ser. No. 09/668,202, filed Sep. 22, 2000, in the names of May et al. and entitled "A Fully Re-Configurable Memory Map" and assigned to the present assignee.

BACKGROUND OF THE INVENTION

The present invention relates to integrated circuits. More specifically, the present invention is directed at configuring a PLD having embedded logic.

A programmable logic device (PLD) is an integrated circuit, which can be customized by a system designer to perform different logical functions. PLDs combine the advantages of fixed integrated circuits with the flexibility of custom integrated circuits. By using these devices, custom logic functions can be designed and fabricated in-house, while eliminating long engineering lead times, high tooling costs, and dedicated inventory problems associated with custom devices. Furthermore, the design can be easily changed without upsetting design schedules and purchase agreements.

PLDs often comprise a plurality of generic logic blocks that may be arbitrarily programmed and interconnected to each other. These blocks may be implemented using volatile memory such as static random access memory (SRAM) or, alternatively, with nonvolatile memory such as erasable programmable read only memory (EPROM), electrically erasable programmable read only memory (EEPROM), fuses, and antifuses. If the programmable elements are volatile memories, the memory cells must be configured upon system power-up in order for the device to operate as desired. This is typically done by loading configuration data from an external configuration source into the PLD. The configuration source may be, for example, a nonvolatile memory such as a FLASH memory. Configuration of the PLD is accomplished by transferring the configuration data from the configuration source to the PLD.

Recently, there has been a trend to embed other logic devices such as within a PLD. Embedded devices (i.e. "embedded logic") may comprise control logic and other application specific logic devices such as, volatile memory, non-volatile memory, cache, etc. and are embedded prior to configuration of the programmable logic core. A processor (or central processing unit CPU)) may also comprise part of the embedded logic. A processor is an integrated circuit implemented on a semiconductor chip, which typically includes, among other things, an instruction execution unit, register file, arithmetic logic unit (ALU), multiplier, etc. Processors are found in digital systems, such as personal computers for executing instructions, and can also be employed to control the operation of most digital devices.

While the addition of embedded logic has proven to be desirable, there remains a need of a method for setting up (i.e., configuring) embedded logic devices, in addition to configuring the PLD core.

SUMMARY OF THE INVENTION

The following detailed description and the accompanying drawings provide a better understanding of the nature and advantages of the present invention.

In a first aspect of the present invention, a method of configuring a system having a programmable logic device and embedded logic is disclosed. The method includes the step of supplying a single serialized configuration bit stream to the system. The bit stream is characterized by a unique protocol and includes a first configuration data section for configuring the programmable logic device and a second configuration data section for configuring the embedded logic.

In a second aspect of the invention a digital system having a programmable logic device and embedded logic coupled to the programmable logic device is disclosed. A configuration source is provided to supply a single serialized configuration bit stream for configuring both the programmable logic device and the embedded logic.

In a third aspect of the invention, a configuration apparatus for providing configuration data to a system on a chip is disclosed, the system including embedded logic and a programmable logic device. The configuration apparatus comprises a configuration data bit stream register having a header including an address field containing an address of a logic device within the embedded logic, and a data field containing data configuration data for configuring the logic device.

The following detailed description and accompanying drawings provide a better understanding of the nature and advantages of the present invention.

DESCRIPTION OF THE SPECIFIC EMBODIMENTS

Figure 1:
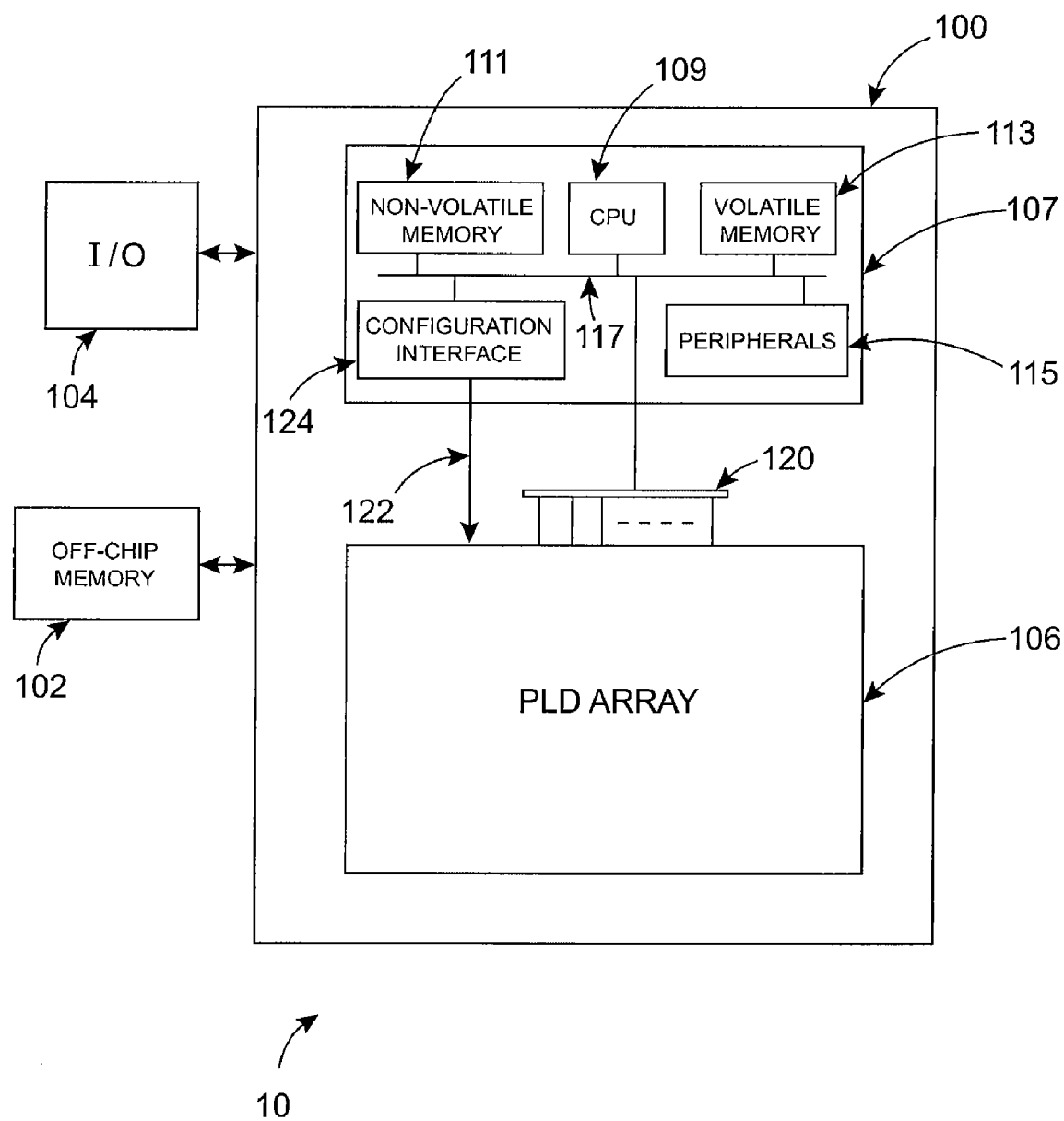
FIG. 1 shows a block diagram of a digital system, according to an embodiment of the present invention.

FIG. 1 shows a block diagram of a digital system within which the present invention may be embodied. The system may be provided on a single board, on multiple boards, or even within multiple enclosures. FIG. 1 illustrates a system 10 in which a programmable logic device 106 may be utilized. Programmable logic devices are currently represented by, for example, Altera's MAX®, FLEX®, and APEX™ series of PLDs. System 10 may be a digital computer system, digital signal processing system, specialized digital switching network, or other processing system. Moreover, such systems may be designed for a wide variety of applications such as, merely by way of example, telecommunications systems, automotive systems, control systems, consumer electronics, personal computers, and others.

In the exemplary embodiment of FIG. 1, a semiconductor device 100 is coupled to a memory 102 and an I/O 104 and comprises a programmable logic device (PLD) 106 and embedded logic 107, which may include, among other components, a CPU (or processor) 109, non-volatile memory 111, volatile memory 113 and other peripherals 115. PLD array 106 and all of the embedded logic resources are coupled to a system bus 117.

Figure 2:
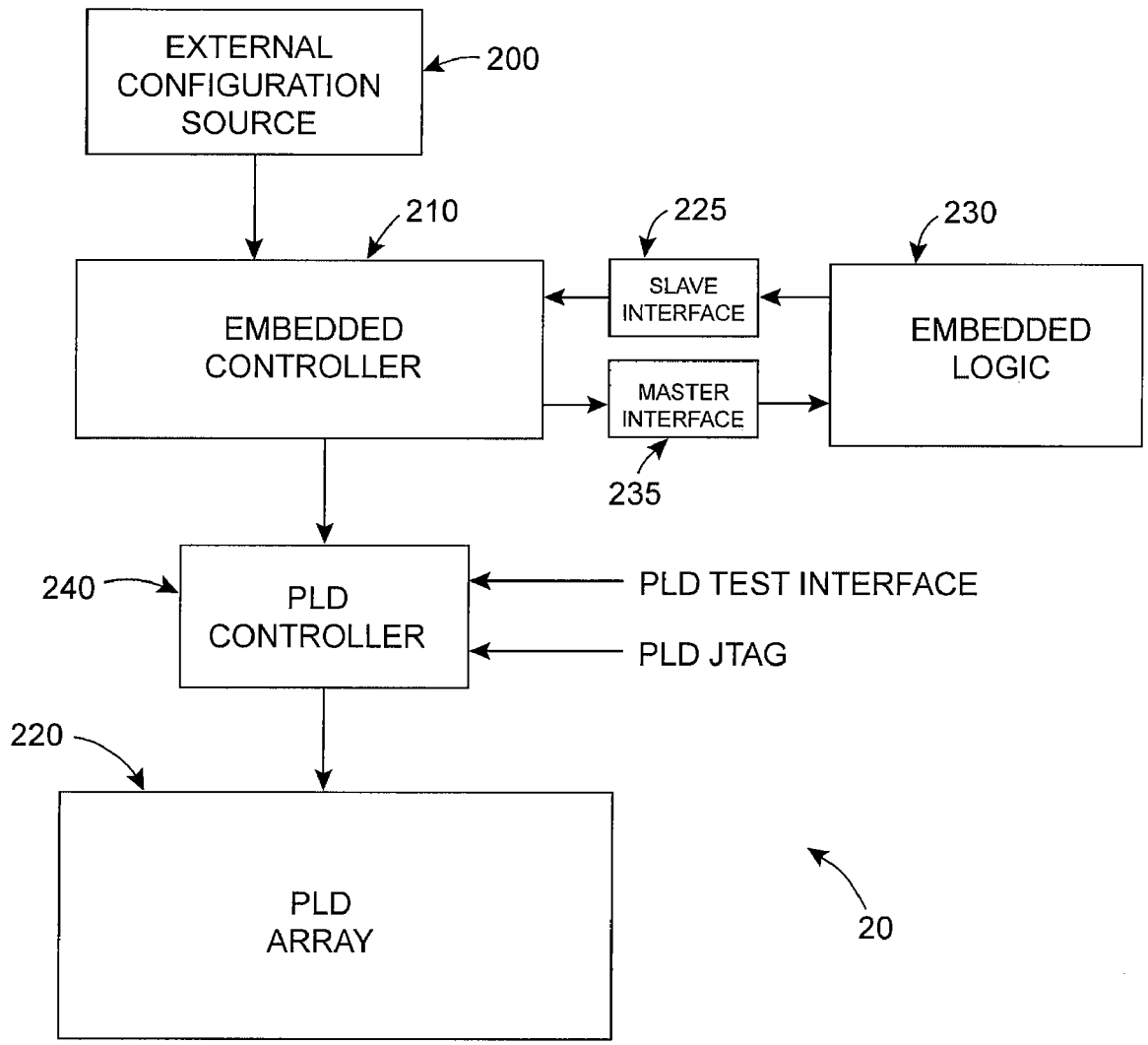
FIG. 2 shows an exemplary configuration logic block diagram, according to an embodiment of the present.

Referring now to FIG. 2, there is shown a block diagram showing an exemplary configuration logic block diagram, according to an embodiment of the present invention. Embedded controller 210 is configured to accept configuration data from one of two sources, external configuration source 200 or slave interface 225. External configuration source 200 can provide the configuration data and may be stored in a memory such as, but not limited to, RAM, cache memory, hard disk drives, floppy disk, CDROM, etc.

In one embodiment, configuration data can be presented in the form of a serial bit stream, according to the following format: <address, [length], data, [CRC]>. As an example, for a $2^n$ address space, the address field would be expressed as an n-bit word, the length field would identify the number of n-bit words comprising the configuration data and the data field would comprise the serial stream of n-bit configuration data words. The CRC (cyclic redundancy check) field is used for data protection.

In one embodiment, the configuration data comprises two main sections: configuration data for PLD array 220 and configuration data for embedded logic 230. In accordance with this, a first configuration data bit stream is sent to embedded logic 230 first, via master interface 235, and then, optionally, a second configuration data section is sent to PLD array 220, via PLD controller 240. Transfer of the configuration data to PLD controller 240 may be in the form of a serial bit stream mode or in the form of a parallel synchronous mode. This embodiment is illustrated in FIG. 1 where a parallel interface 120 to PLD array 106 (via system bus 117) is shown as well as a serial interface 122 to PLD array 106 via a configuration interface 124. Serial mode is used for all transfers while parallel synchronous mode is used for configuration data received from slave interface 225. PLD array 220 may also be configured by use of an industry standard protocol such as, for example, JTAG (IEEE Standard 1149.1).

In an alternative embodiment, any of the resources of embedded logic 230 may be configured and/or the PLD array 220 may be configured, in any order. For example, in one embodiment a processor of embedded logic 230 may be configured without configuring PLD array 220 and then configuration of PLD array 220 could be performed from an external source, such as external memory, internal memory or the Internet. In yet another embodiment a user could disable embedded logic 230, either circuit by circuit or in total.

The complete set of configuration data for configuring the embedded logic (e.g. on-chip RAM) is preferably contained within a configuration data file stored, for example, in external configuration source 200. In this exemplary embodiment, the configuration data file comprises a configuration file header, followed by a configuration file preamble, followed by an options register. Configuration data is then presented, followed by an end of file (EOF) block, which signifies that the configuration data for embedded logic is complete. Finally, the configuration file ends with a configuration file postamble.

The address field preferably has certain control bits, which are descriptive of the data. For an exemplary 32-bit address field, addresses are multiples of four. So the least two significant bits of an address field may be used for other purposes. (A similar situation is the case for larger or smaller address field sizes.) For the 32-bit example, bit 0 (i.e. the least significant bit) may, depending on whether its value is 1 or 0, indicate that either the next word holds a data length value or that the length value has been omitted. Another bit, for example bit 1, may indicate that a CRC follows the data. The configuration file header, configuration file preamble and configuration file postamble are comprised of a set number of bits having a predefined bit pattern, e.g. 111 . . . 111 (16 bits, all 1's), 01000110 (8 bits).

The options register, as referred to above, comprises part of the configuration data file. On power up, all bits of the options register are preferably reset (e.g. to all 1's). Following power up, the serial data stream determines the values of these bits. The options register contains a predetermined number of bits, which indicate, for example, whether PLD configuration data follows the current transfer, how the system responds to a configuration error (i.e shut-down or auto-configure), the compatibility and identification of programmer object files (POFs). By default, the value of option register bit 0 bit is set such that it indicates PLD configuration data follows the current transfer. However, this bit may optionally be set to indicate to the embedded controller that there is no PLD configuration data following the current transfer.

Figure 3:
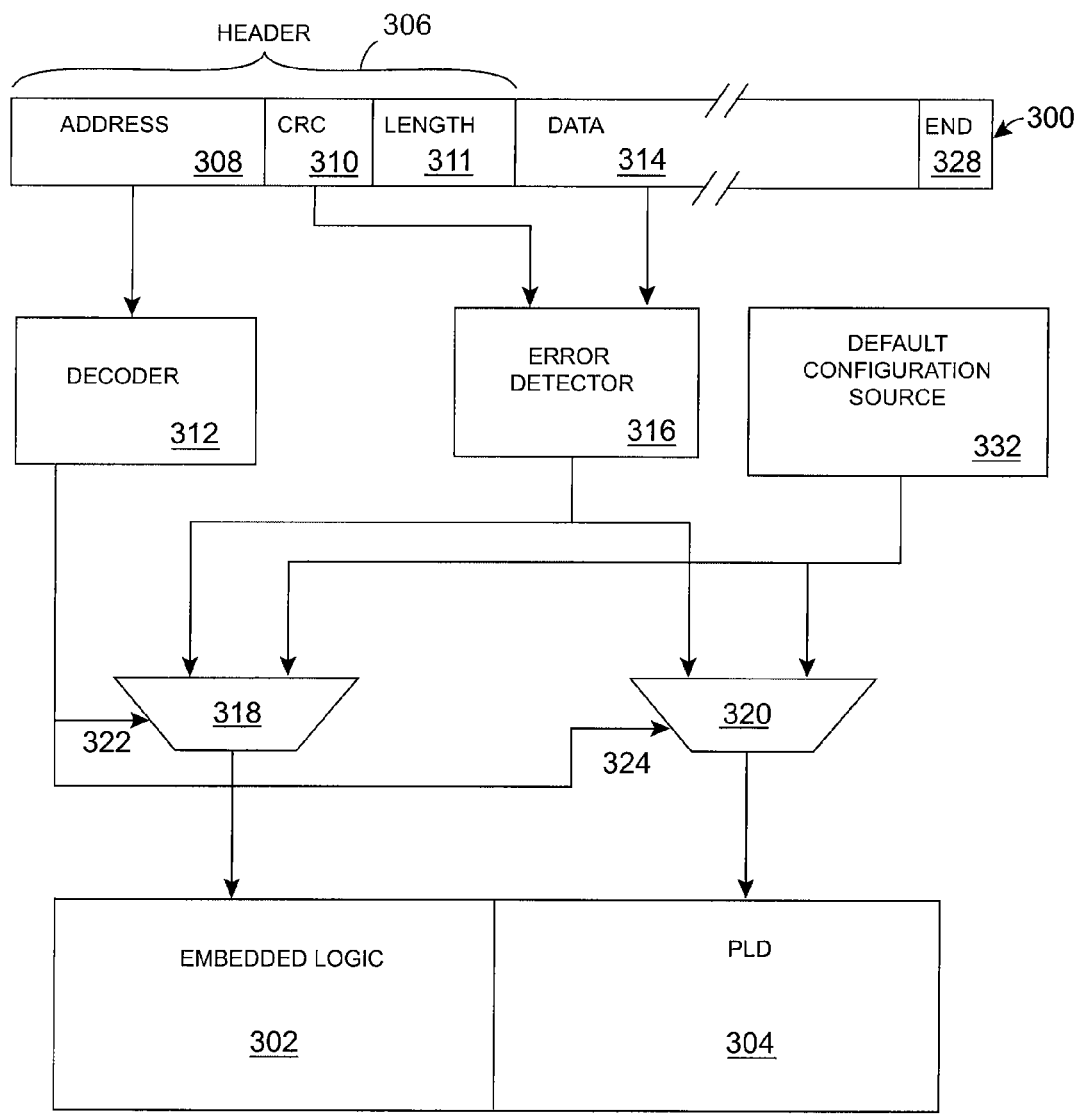
FIG. 3 shows an exemplary configuration apparatus, according to an embodiment of the present invention.

Referring now to FIG. 3, there is shown another embodiment 30, according to the present invention. Embodiment 30 comprises a serial bit stream 300 register containing configuration information for configuring embedded logic 302 and/or a PLD 304. In an exemplary embodiment, PLD 304 and embedded logic 302 are disposed on a single semiconductor chip. The configuration information comprises a header including an address field 308, CRC field 310 and length field 311. Length field 311 contains information on the length of the configuration data. Address field 308 is received by a decoder 312, which determines what system resource is to be configured. A system resource may be PLD 304 or a logic device within embedded logic 302. CRC data in CRC field 310 and configuration data 314 are supplied to an error detector 316. If no error is detected by error detector 316, configuration data 314 is transferred to multiplexers 318 and 320, which are controlled by decoder 312 at control inputs 322 and 324, respectively. Which multiplexer 318 or 320 is enabled is determined by address information supplied from address field 308 and decoded by decoder 312. If the decoded address information identifies a logic device within embedded logic 302, multiplexer 318 is selected, thereby allowing configuration data to be transferred to the associated logic device in embedded logic 302. On the other hand, if the decoded address information identifies PLD 304 then multiplexer 320 is selected to allow the configuration data to be transferred to PLD 304. In any case, transfer of data is completed by the detection of end of data bits(s) in an end field, which are concatenated to the configuration data. In the absence of a configuration data bit stream, in an alternative embodiment configuration data may be supplied by a default configuration source 330 so that, for example, the system can be automatically setup during power up or after a reset condition.

The configuration logic function described above may also comprise a processor boot load/source function, which tells the processor whether it should boot from Flash memory or from on-chip RAM. If boot from Flash is the boot mode, configuration data is received after the processor has booted. For boot from on-chip RAM mode, the processor is held in a reset condition until configuration data is received to configures PLD array 220 and configuration data is received for setting up on-chip RAM and/or registers within the embedded logic, which may specify, for example, a memory map for the system. Following configuration under this mode, the processor is released to boot.

In conclusion, the present invention discloses method and apparatus for configuring both a PLD array and embedded logic from a single serial bit stream. The foregoing description of preferred exemplary embodiments has been presented for the purposes of description. It is not intended to be exhaustive or to limit the invention to the precise form described herein, and modifications and variations are possible in light of the teaching above. Accordingly, the true scope and spirit of the invention is instead indicated by the following claims and their equivalents.

What is claimed is:

1. An integrated circuit comprising:
    a programmable logic array;
    an embedded logic section comprising application specific logic circuits;
    an embedded controller;
    a master interface coupled to the embedded controller and the embedded logic section; and
    a PLD controller coupled to the embedded controller and the programmable logic array,
    wherein the embedded controller is operable to receive configuration data from an external configuration source, to transfer a first section of the configuration data to the embedded logic section through the master interface, and to transfer a second section of the configuration data to the programmable logic array through the PLD controller, and
    wherein the PLD controller is operable to control a configuration of the programmable logic array using other configuration data, wherein none of the other configuration data is received by the master interface or the embedded logic.

2. The integrated circuit defined in claim 1 wherein the embedded controller is operable to receive configuration data from the embedded logic section through a slave interface coupled to the embedded controller and the embedded logic section.

3. The integrated circuit defined in claim 1 wherein the second section of the configuration data is transferred to the PLD controller in parallel mode.

4. The integrated circuit defined in claim 1 wherein the second section of the configuration data is transferred to the PLD controller in serial mode.

5. The integrated circuit defined in claim 1 wherein the first section of the configuration data comprises:
    a first header identifying the embedded logic section;
    a first address field identifying a resource in the embedded logic section that is being configured;
    a first stream of configuration data for configuring the resource; and
    a first end of file indicator for indicating that the first stream of configuration data has been transferred to the resource.

6. The integrated circuit defined in claim 5 wherein the second section of the configuration data further comprises:
    a second header identifying the programmable logic array;
    a second address field identifying a resource in the programmable logic array that is being configured;
    a second stream of configuration data for configuring the resource; and
    a second end of file indicator for indicating that the second stream of configuration data has been transferred to the resource.

7. The integrated circuit defined in claim 1 further comprising an error detection circuit that receives the configuration data.

8. The integrated circuit defined in claim 1 wherein the embedded controller comprises two multiplexers that route the configuration data to the programmable logic array and the embedded logic section.

9. The integrated circuit according to claim 1 wherein none of the other configuration data is received by the embedded controller.

10. The integrated circuit according to claim 9 wherein the other configuration data is received by the PLD controller directly from a JTAG interface.

11. A method for configuring a programmable logic integrated circuit comprising:
    supplying a first configuration data to an embedded controller from an external configuration source;
    transferring the first configuration data from the embedded controller to an embedded logic section of the integrated circuit through a master interface;
    configuring resources in the embedded logic using the first configuration data;
    transferring a second configuration data from the embedded logic section through a slave interface to the embedded controller;
    transferring the second configuration data from the embedded controller to a programmable logic array of the integrated circuit through a PLD controller; and
    configuring resources in the programmable logic array using the second configuration data.

12. The method defined in claim 11 wherein transferring the first configuration data to the embedded logic section further comprises transferring the first configuration data to the embedded logic section through a first multiplexer.

13. The method defined in claim 12 wherein transferring the second configuration data to the programmable logic array further comprises transferring the second configuration data to the programmable logic array through a second multiplexer.

14. The method defined in claim 13 further comprising:
    decoding address signals in a header of the configuration data to generate decoded address signals; and
    controlling the first and the second multiplexers using the decoded address signals.

15. The method defined in claim 11 wherein the configuration data is supplied to the embedded controller as a single serialized bit stream.

16. The method defined in claim 11 further comprising:
    detecting errors in the configuration data using an error detection circuit on the integrated circuit.

17. The method defined in claim 11 wherein the embedded logic section of the integrated circuit includes a central processing unit (CPU).

18. The method defined in claim 17 wherein transferring the first configuration data to the embedded logic section further comprises transferring configuration data that tells the CPU to boot from a Flash memory or from an on-chip RAM.

19. An integrated circuit comprising:
    a programmable logic array;
    a central processing unit (CPU);
    an embedded controller;
    a master interface coupled to the embedded controller and the CPU; and a PLD controller coupled to the embedded controller and the programmable logic array, wherein the embedded controller is operable to receive a single stream of configuration data from an external configuration source, to transfer a first section of the configuration data to the CPU through the master interface, and to transfer a second section of the configuration data to the programmable logic array through the PLD controller, and wherein the embedded controller is operable to receive other configuration data from the CPU through a slave interface and is operable to transfer the other configuration data to the PLD controller.

20. The integrated circuit according to claim 19 wherein the embedded controller comprises two multiplexers that route the configuration data the programmable logic array and the CPU.

* * * * *